United States Patent
Lang et al.

(10) Patent No.: US 10,953,781 B2
(45) Date of Patent: Mar. 23, 2021

(54) PERSONAL OBJECT HOLDER HAVING AN ADAPTIVE SHAPE

(71) Applicant: Bayerische Motoren Werke Aktiengesellschaft, Munich (DE)

(72) Inventors: Franziska Lang, Ventura, CA (US); Martin Francisco, Pasadena, CA (US); Eric Brown, North Hollywood, CA (US); Matthew Potter, Porter Ranch, CA (US); Paul Ferraiolo, Ventura, CA (US); Ross Carmichael, Everett, WA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 73 days.

(21) Appl. No.: 16/391,056

(22) Filed: Apr. 22, 2019

(65) Prior Publication Data
US 2020/0331376 A1    Oct. 22, 2020

(51) Int. Cl.
| B60N 3/10 | (2006.01) |
| B60R 7/04 | (2006.01) |
| B60R 11/02 | (2006.01) |
| H02J 7/00 | (2006.01) |
| B60R 11/00 | (2006.01) |

(52) U.S. Cl.
CPC ............... *B60N 3/105* (2013.01); *B60R 7/04* (2013.01); *B60R 11/0241* (2013.01); *H02J 7/0042* (2013.01); *B60R 2011/0084* (2013.01)

(58) Field of Classification Search
CPC ....... B60N 3/105; B60R 7/04; B60R 11/0241; B60R 2011/0084; H02J 7/0042
See application file for complete search history.

(56) References Cited

U.S. PATENT DOCUMENTS

| 2014/0367433 A1* | 12/2014 | Rifel | B60N 3/10 224/485 |
| 2018/0029514 A1* | 2/2018 | Salinas | B60N 3/105 |
| 2020/0070708 A1* | 3/2020 | Kim | B60N 3/102 |

* cited by examiner

*Primary Examiner* — D Glenn Dayoan
*Assistant Examiner* — Melissa Ann Bonifazi
(74) *Attorney, Agent, or Firm* — Crowell & Moring LLP

(57) ABSTRACT

A system for holding a personal object for a motor vehicle is described. The system includes a segmented surface having a plurality of adjacent surface elements. The system also includes a plurality of actuators, each actuator associated with a surface element and configured to extend and/or retract the associated surface element. The system also includes a sensor system configured to detect circumstances affecting the holding of the personal object by the segmented surface. The system also includes a controller operably coupled to the actuators and the sensor system, the controller configured to selectively control the actuators to extend and/or retract associated surface elements based on the detected circumstances so as to form a holding area appropriate for holding the personal object.

19 Claims, 5 Drawing Sheets

PERSONAL OBJECT HOLDER HAVING AN ADAPTIVE SHAPE

FIELD OF THE INVENTION

The present invention relates generally to motor vehicle based personal object holders, and in particular, to such personal object holders that adapt their shape to the circumstances of the holding.

BACKGROUND OF THE INVENTION

Modern motor vehicles often include several structures in which personal objects are held during use of the motor vehicle. It has indeed become commonplace for motor vehicles to include cup holders, key and/or phone trays, door panel cubbies, loose change compartments, and other structures for holding personal objects within the motor vehicle.

The effective use of such traditional personal object holders is limited, however, by their predefined static "standard" geometries to holding specific objects, or those of similar geometry. This is problematic for users who find that their cup is too big, their bottle too small, or their mobile phone/smart device is too oddly shaped to fit satisfactorily in a holder with a "standard" geometry. The limited geometry is also problematic for vehicle manufacturers who sell vehicles among nations with different "standard" geometries for similar objects. For example, the standard size of a drive-thru restaurant cup in the United States of America is larger than the standard size of a drive-thru restaurant cup in Europe. The current response to this problem is for vehicle manufacturers to equip vehicles with multiple holders according to several different "standard" geometries, e.g., cars with both U.S. sized cup holders and European sized cup holders. This leads to increased costs and wasted space.

Moreover, in the future, the driving experience is more and more likely to involve switching between different modes of operation for which the circumstances relating to holding the object are changed during driving. A coffee mug may be held less securely under some circumstances (e.g., when the vehicle is in an autonomous cruising mode) than others (e.g., when the vehicle is in a racetrack or turbo mode). The evolving driving experience may also result in what is thought of as the typical driving position (i.e., the driver sitting upright in the driver side chair with his/her hands on/near the steering wheel and feet on/near the pedals) also evolving to be more dynamic. In such instances, static geometries for holding objects may also limit the driving experience.

As such, there is a need for systems and methods for holding personal objects, which do not suffer from the above-noted drawbacks.

SUMMARY OF THE INVENTION

Disclosed and claimed herein are systems and methods for adapting the shape of a personal object holder to the circumstances of the holding.

The system for holding a personal object in a motor vehicle includes a segmented surface having a plurality of adjacent surface elements. The system also includes a plurality of actuators, each actuator associated with a surface element and configured to extend and/or retract the associated surface element. The system also includes a sensor system configured to detect circumstances affecting the holding of the personal object by the segmented surface. The system also includes a controller operably coupled to the actuators and the sensor system, the controller configured to selectively control the actuators to extend and/or retract associated surface elements based on the detected circumstances so as to form a holding area appropriate for holding the personal object. Accordingly, the holding area may be dynamically adjusted to the circumstances of the holding.

Other objects, advantages, aspects and features of the present invention will be apparent to one skilled in the relevant art in view of the following detailed description of one or more exemplary embodiments.

BRIEF DESCRIPTION OF THE DRAWINGS

The features, objects, and advantages of the present invention will become more apparent from the detailed description, set forth below, when taken in conjunction with the drawings, in which like reference characters identify correspondingly throughout and wherein.

DETAILED DESCRIPTION OF THE PREFERRED EMBODIMENTS

Figure 1:
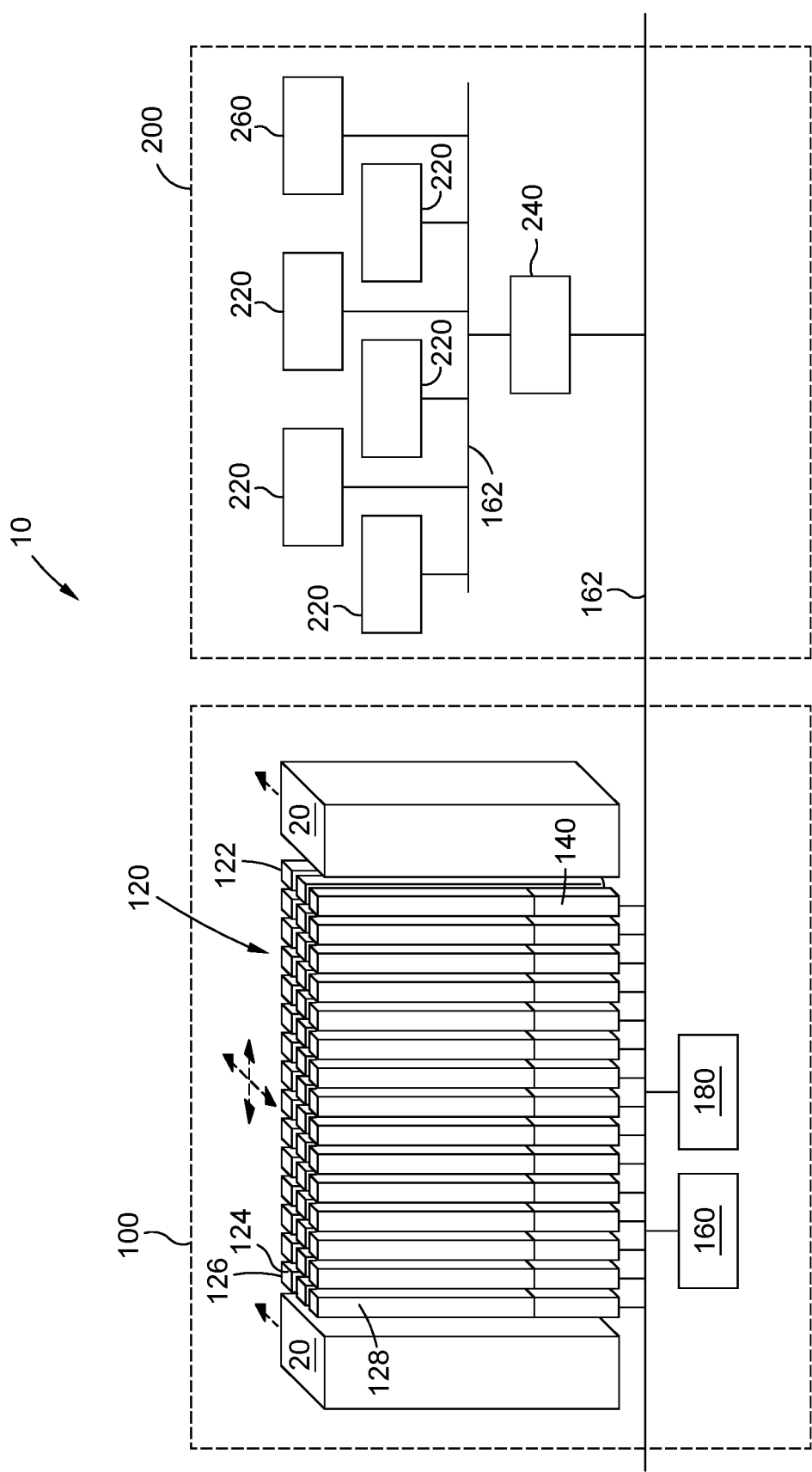
FIG. 1 is a schematic view of an exemplary personal object holding system.

The above described drawing figures illustrate the present invention in at least one embodiment, which is further defined in detail in the following description. Those having ordinary skill in the art may be able to make alterations and modifications to what is described herein without departing from its spirit and scope. While the present invention is susceptible of embodiment in many different forms, there is shown in the drawings and will herein be described in detail at least one preferred embodiment of the invention with the understanding that the present disclosure is to be considered as an exemplification of the principles of the present invention, and is not intended to limit the broad aspects of the present invention to any embodiment illustrated. It will therefore be understood that what is illustrated is set forth for the purposes of example, and should not be taken as a limitation on the scope of the present invention.

FIGS. 1-4 illustrate a personal object holding system 10 for a motor vehicle (not shown). The personal object holding system 10 includes a personal object holder 100 and a sensor system 200. In general, the personal object holder 100 is configured to adapt to form one or more personal object holding areas 130 based on circumstances detected by the sensor system 200, including the identity of the object to be held, its shape, its size, its location, and/or other circumstances that might affect the holding of the object.

The personal object holder 100 includes a segmented surface 120 comprised of a plurality of adjacent surface elements 122, a plurality of actuators 140 configured to extend/retract the surface element(s) 122 to form the one or more holding areas 130, a controller 160 configured to control the actuators 140 to extend/retract to form the one or more holding areas 130, and a memory 180 configured to store executable software instructions for implementing the various functionalities described herein.

Each surface element 122 includes a top surface 124 defined by a periphery 126. Each surface element 122 also includes a sidewall 128 that is continuous along the periphery 126 of the top surface 124, and extends perpendicularly from the top surface 124 in the direction of retraction (e.g., substantially downward) for a predetermined length. The top surface 124 periphery 126 may be any closed shape, including polygons and/or curvilinear shapes. Moreover, the periphery 126 may be selected such that the top surfaces 124 (and therefore the surface elements 122) are partially or wholly tessellated.

Each actuator 140 is associated with one or more surface elements 122 and is configured to extend/retract the associated surface element(s) 122 to form the one or more holding areas 130 in response to a control signal received from the controller 160. The actuators 140 preferably comprise electric, hydraulic, pneumatic, magnetic or other actuators 140 configured to selectively extend and retract under the control of the controller 160. Such actuators 140 are known in the art, and are not independently the subject of the invention.

The controller 160 is operably coupled to the actuators 140 and to the sensor system 200, and is configured to generate the control signal based on circumstances detected by the sensor system 200, as described herein.

The sensor system 200 includes one or more sensors 220 operably coupled to a control unit 240, and a memory 260 configured to store executable software instructions for implementing the various functionalities described herein. The sensor system 200 is configured to detect circumstances that might affect the holding of the personal object by the personal object holder 100, and to communicate the detected circumstances to the personal object holder controller 160. Such circumstances include, but are not limited to, the shape of the object, the location of the object, the behavior of a user, and driving conditions. Accordingly, the sensors 220 may include one or more pressure sensors, proximity sensors, motion sensors, cameras, accelerometers, gyroscopes, magnetometers, etc., each operatively coupled to the controller 160. The sensors 220 need not be exclusive to the personal object holding system 10, but may be shared with other vehicle systems such that the sensor system 200 is part of an expanded sensor system that generally detects circumstances related to the motor vehicle and its occupants. Moreover, although the sensor system control unit 240 is described herein as a separate structure, it will be understood that the control unit 240 may be partially or wholly realized as additional functionality of the personal object holder controller 160, which may itself also be realized as a vehicle CPU.

Communication amongst the various components is accomplished via one or more buses and/or wired and/or wireless network interfaces 162.

Exemplary control of the personal object holder 100 will now be described with reference to FIGS. 1-4. The controller 160 is configured to control the actuators 140 to selectively extend and/or retract one or more surface elements 122 to form the one or more holding areas 130 in response to the detected circumstances. The form that the segmented surface 120 takes is referred to herein as a profile. The surface elements 122 may therefore originate in a neutral position corresponding to a neutral profile to various extended/retracted positions corresponding to one or more holder profiles.

The neutral profile may be substantially planar or otherwise substantially consistent with that of a surrounding surface 20 of the personal object holder 100 (e.g., a dashboard surface, a console surface, an armrest surface, etc.). For example, the segmented surface 120 may be located in a center console region of the vehicle interior, and accordingly, the neutral profile may cause the periphery 126 of the segmented surface 120 to be substantially flush with the center console region, and the interior of the segmented surface 120 continues the arc or gradient that the center console region would have if the segmented surface 120 were not present. In this manner, the segmented surface 120, while corresponding to the neutral profile, may offer a more attractive appearance by at least partially passing off the segmented surface 120 as a continuation of the console region where it is located. An exemplary neutral profile is shown for illustrative purposes in FIG. 1.

Each holder profile includes one or more holding areas 130 for holding the object therein, and results from the controlled extension/retraction of one or more surface elements 122 from positions corresponding to the neutral profile or a previous holder profile. An exemplary holder profile is shown for illustrative purposes in FIG. 2. Although described herein as distinct, it will be understood that the neutral profile may correspond to one of the holder profiles, and vice versa.

In at least one embodiment, each profile associates the surface elements 122 with respective extension/retraction values representing the magnitude and direction by which to control the extension/retraction of the associated surface element 122 to form the profile. The extension/retraction values may, for example, include a neutral value of n=0, as well as a fully extended value of n=1, and a fully retracted value of n=−1. Controlling surface elements 122 according to the neutral value of n=0 results in the surface elements 122 being extended or retracted to, or maintained at, the neutral position. Controlling surface elements 122 according to the fully extended value of n=1 results in the surface elements 122 being extended or retracted to, or maintained at, the fully extended position. Controlling the associated surface element 122 according to the fully retracted value of n=−1 results in the surface elements 122 being extended or retracted to, or maintained at, the fully retracted position. Intermediate extension/retraction values may correspondingly control surface elements 122 according to intermediate magnitudes of extension/retraction.

FIGS. 2 and 3A-3C illustrate exemplary holder profiles in which the respective segmented surfaces 120 are formed, via extended/retracted surface elements 122, into cup holders. As can be seen, the extended/retracted surface elements 122 delineate holding areas 130 of suitable shape, size and location for holding the cup. Each holding area 130 is defined by a rest surface 132 comprising one or more top surfaces 124 on which the object may rest. The holding area 130 may further be defined by one or more barriers 134 comprising at least one sidewall 128 providing lateral support and/or restriction for the object.

Figure 4A:
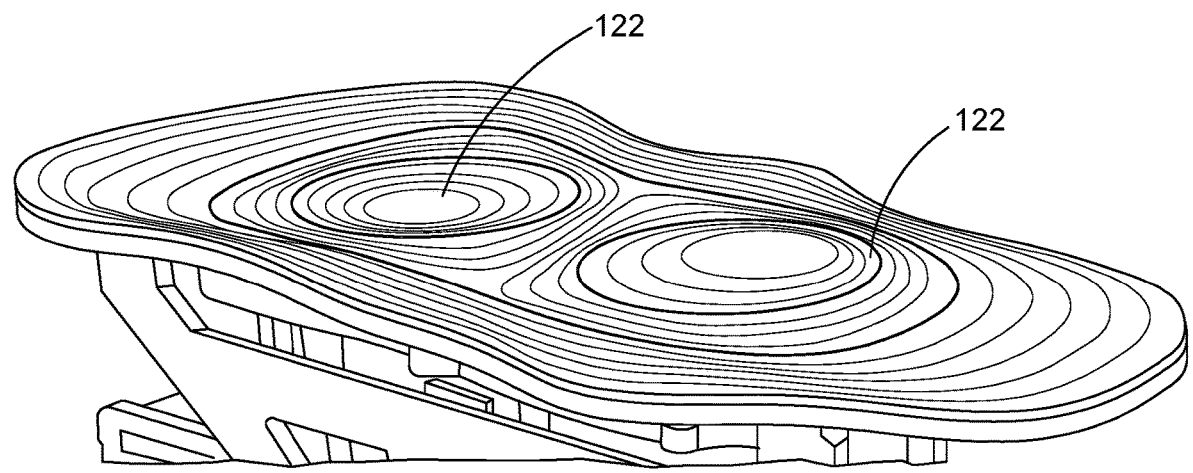
FIGS. 4A-4B are series perspective views illustrating aspects of the exemplary method for using the personal object holding system.
Figure 4B:
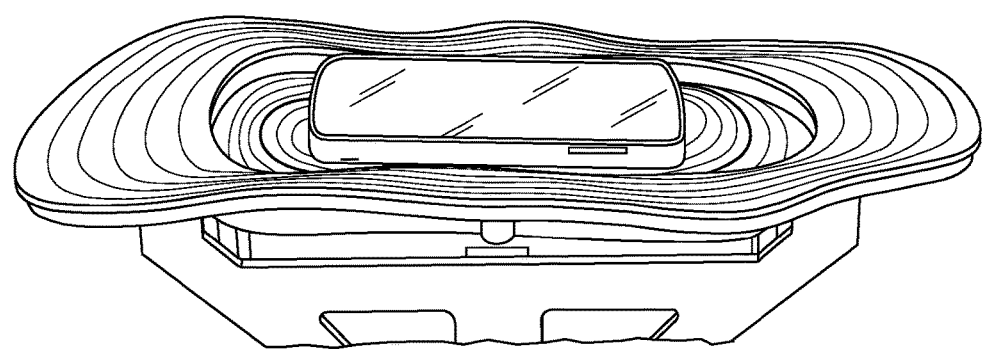

FIGS. 4A-4B illustrate an exemplary holder profile in which the segmented surface 120 is formed, via extended/retracted surface elements 122, into a smartphone tray. As can be seen, the extended/retracted surface elements 122 delineate the holding area 130 of suitable shape, size and location for holding the smartphone.

It will be understood that the size, shape and location of the holder profile may vary depending on circumstances, as described herein. Accordingly, it is expressly contemplated that the holding area 130 take on irregular shapes, and not be limited to regular or traditional shapes. It is also contemplated that more than one holding area 130 may be formed, and that such holding areas 130 may be distinct or may merge.

Each of the profiles is preferably stored in the memory 180, and is accessed in response to the detected circumstances. Each profile is preferably stored in association with one or more recognized circumstances. Thus, when the detected circumstances correspond to recognized circumstances that may affect the holding, the profile associated with the recognized circumstances is accessed by the controller 160, which in turn controls the actuators 140 to extend/retract accordingly so as to form the associated profile that includes the appropriate holding area 130 for the recognized circumstances. The recognition techniques utilized may generally correspond to known recognition techniques.

The recognized circumstances may include recognition of the size of the object being placed on the personal object holder 100. For example, the system 10 may recognize that the object is a larger beverage container, and may adopt a holder profile having a holding area 130 to accommodate the larger beverage container rather than a smaller beverage container. Such accommodation may involve forming the holding area 130 deeper and wider than would occur for the smaller beverage container.

The recognized circumstances may also include recognition of the shape of the object being placed on the personal object holder 100. For example, the system 10 may recognize that the object is a box rather than a cylinder, and may adopt a holding profile having a rectangular holding area 130 in response.

The recognized circumstances may also include recognition of the location of the object being placed on the personal object holder 100. For example, the system 10 may recognize that the object is being placed near the front of the segmented surface 120, and may adopt a holder profile having a holding area 130 more to the front of the segmented surface 120. Thus, the holding area 130 may be formed in the appropriate region for receiving and holding the object.

The recognized circumstances may also include recognizing the identity of the object being placed on the personal object holder 100. For example, the system 10 may recognize that the object is an open coffee mug rather than a closed thermos, and may adopt a holder profile having a holding area 130 that is deeper, includes a barrier 132, and/or is further positioned from the user, so as to avoid or mitigate spillage.

The recognized circumstances may also include recognition that no object is being placed on the personal object holder 100, in which case, the neutral profile may be adopted.

The recognized circumstances may also include recognition of driving conditions. For example, the system 10 may recognize that the vehicle is experiencing or is about to experience a sudden acceleration, deceleration, and/or change of direction, and/or the onset of a bumpy road, and/or a loss of traction, any of which may result in the current holder profile becoming insufficient to adequately hold the object. In response to such recognition, the system 10 may adopt a holder profile that more securely holds the object therein. Such adjustment may, for example, include deepening the holding area 130, changing its shape, or otherwise adapting the holding area 130 to accommodate the changed/changing circumstances that are detected. Accordingly, the personal object holding system 10 exhibits an adaptive and dynamic response to detected changed and changing circumstances.

Such adaption may also include adapting the holding area 130 such that the rest surface 132 such that the object contacts such surface elements 122 at points lying within an angled plane, in effect, resulting in a de facto tilted rest surface 132. Accordingly, the holding area 130 may be adjusted to account for the vehicle travelling at a tilted attitude, e.g., at an incline, decline, or turning angle, via effectively tilting the rest surface 132.

The dynamic response may also include adjusting the shape of the holding area 130 to facilitate the user extracting the object from the personal object holder 100. For example, it may be detected that the user's hand is approaching the holding area 130 holding the user's drink. In response to such detection, the system 10 may control the holding area 130 so as to lift or otherwise adapt the object within the holding area 130 so as to bring the object closer to the user's approaching hand. Such control may involve, for example, extending the surface elements 122 corresponding to the rest surface 132. Such control may also involve selectively actuating the surface elements 122 to translate the holding area 130, and the object held within, across the personal object holder 100. In this manner, the object held within the holding area 130 may be, for example, brought from a more distal location to a more proximal location with respect to the user, e.g., from a passenger side of the personal object holder 100 to a driver side of the personal object holder 100, or vice versa, or from a more forward location to a more rearward location.

The top surface peripheries 126 of the surface elements 122 are preferably shaped so as to accommodate a wide variety of possible profiles and associated holding areas 130.

Figure 2:
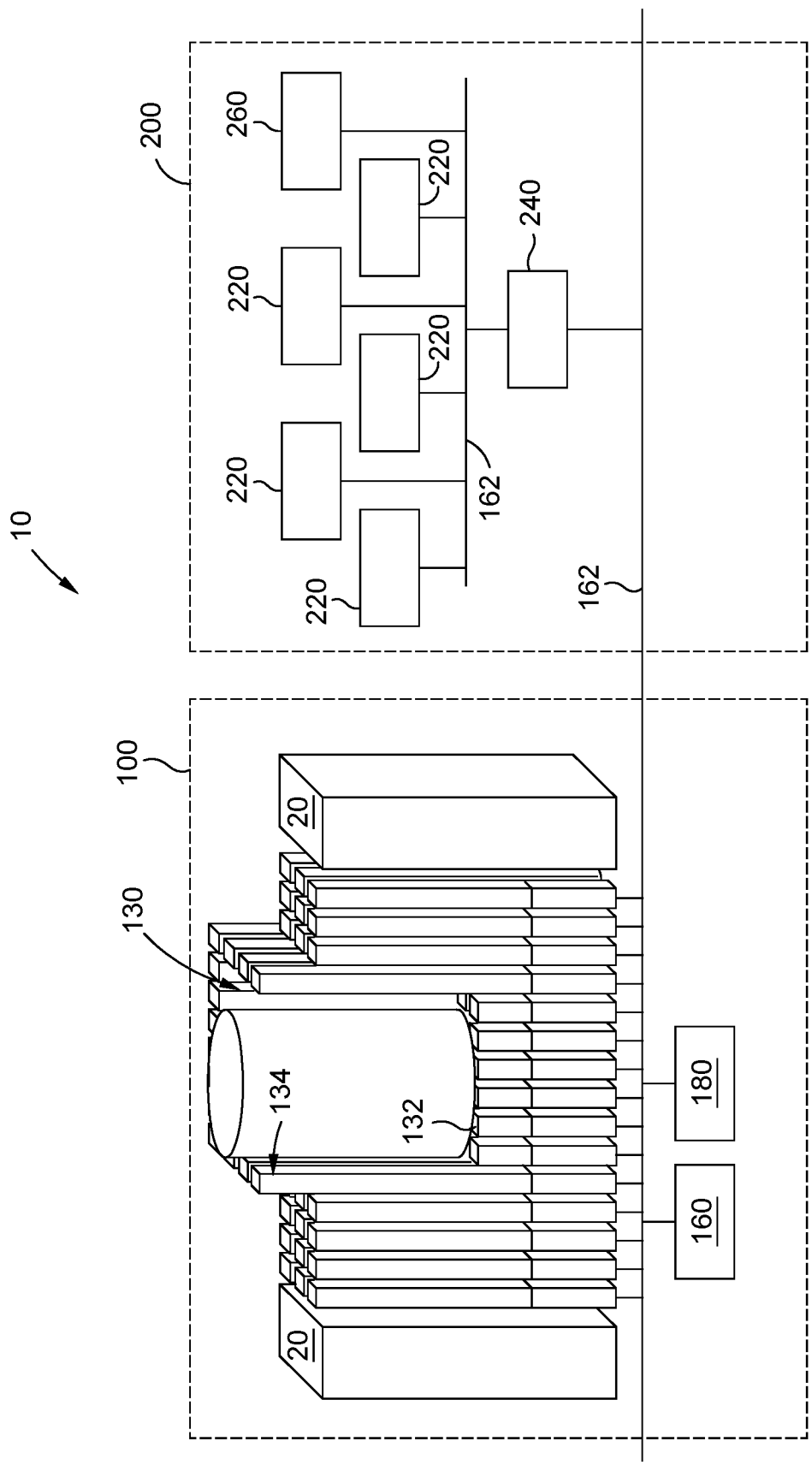
FIG. 2 is a schematic view of the exemplary personal object holding system holding an object.

In at least some embodiments, the peripheries 126 are polygonal. Exemplary polygonal peripheries 126 include hexagonal, rectangular, and triangular. Polygonal peripheries 126 provide an advantage in that the surface elements 122 may be readily tessellated and are therefore highly adaptable. FIGS. 1-2 illustrate tessellated surface elements 122 with polygonal peripheries 126.

The periphery 126 of the top surfaces 124 of the surface elements 122 may additionally or alternatively be curvilinear. Exemplary curvilinear peripheries 126 include circular, elliptical, oval, and otherwise amorphous curves. Curvilinear peripheries 126 provide an advantage in that less surface elements 122 may be needed in order to provide for the majority of circumstances expected. FIGS. 3-4 illustrates surface elements 122 with curvilinear peripheries 126.

As shown in FIGS. 1-2, a gap 110 may also exist between the neighboring sidewalls 128 of adjacent surface elements 122. However, the arrangement of the surface elements 122 is preferably such that the gap 110 has a width that permits the controlled extension/retraction of the surface elements 122 without significant frictional interference, yet also inhibits smaller objects (e.g., keys, credit cards, coins, etc.) and debris (e.g., paper straw casings and other small rubbish) from becoming caught in the gap 110 during the extension/retraction.

In some embodiments, however, the segmented surface 120 includes an elastic overlay 112 layered on top of top surfaces 124 and configured to prevent objects from becoming caught in the gap 110 between surface elements 122. The elastic overlay 112 may cover the segmented surface 120 so as to create a continuous surface, and may be attached at corresponding points to each surface element 122 such that the elastic overlay 112 stretches to cover the sidewalls 128 when the surface elements 122 extend/retract to form the holding area 130. The elastic overlay 112 may also be formed as a webbed surface corresponding to the gaps 110 with apertures corresponding to the top surfaces 124, such that the top surfaces 124 of the surface elements 122 are contactable via the apertures.

In some embodiments, the personal object holding system 10 is also configured to heat/cool the object being held. Accordingly, one or more of the surface elements 122 may be formed from a thermo-electric material, and may be temperature controlled via the control signal, or an auxiliary control signal, from the controller 160. The controller 160 may control the temperature of each temperature controlled surface element 122 in accordance with a temperature value stored in the associated holder profile in a manner similar to the extension/retraction value. In other words, each profile may additionally associate thermos-electric surface elements 122 with the corresponding temperature values according to which the system 10 controls, via the applied current, the respective temperatures of the thermos-electric surface elements 122.

In some embodiments, the personal object holding system 10 is also configured to electrically charge the object being held. Accordingly, one or more of the surface elements 122 may be formed as inductive charging surface elements 122 configured to inductively charge inductively chargeable objects placed thereon. The controller 160 may control the charging state of each temperature controlled surface element 122 in accordance with either an "on" or an "off" charging value stored in the associated holder profile in a manner similar to the extension/retraction value.

Figure 5:
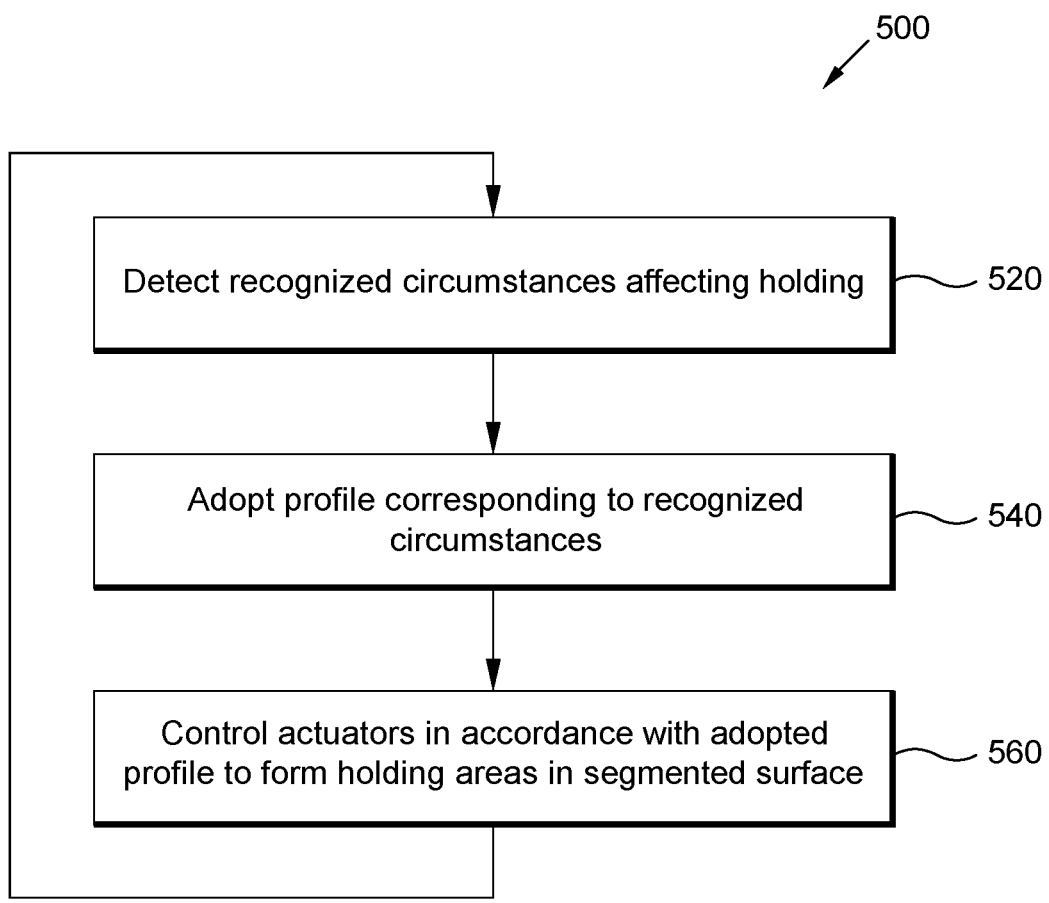
FIG. 5 is a flow-chart of the exemplary method for using the personal object holding system.

A method 500 for operating the personal object holding system 10 will now be described with reference to FIG. 5.

At step 520, the system 10 detects circumstances that might affect the holding of the personal object. As described herein, the detection is accomplished via the sensor system 200. Such circumstances include, but are not limited to, the shape of the object, the location of the object, the behavior of a user, and driving conditions.

At step 540, upon the detection of recognized circumstances, the system 10 adopts the profile corresponding to the recognized circumstances. As described herein, each profile is preferably stored in association with one or more recognized circumstances. When the detected circumstances correspond to recognized circumstances that may affect the holding, the profile associated with the recognized circumstances is accessed by the controller 160 and adopted.

At step 560, the system 10 controls its actuators 140 in accordance with the adopted profile so as to form one or more holding areas 130 in its segmented surface 120. As described herein, when the profile is adopted, the controller 160 controls the actuators 140 to extend/retract accordingly so as to form the associated profile, including the appropriate holding areas 130 for the recognized circumstances.

When new circumstances are detected, the method repeats itself, with the personal object holder 100 transitioning from the previous profile to the profile corresponding to the new circumstances. Dynamically adjustable object holding is therefore realized.

Figure 3A:
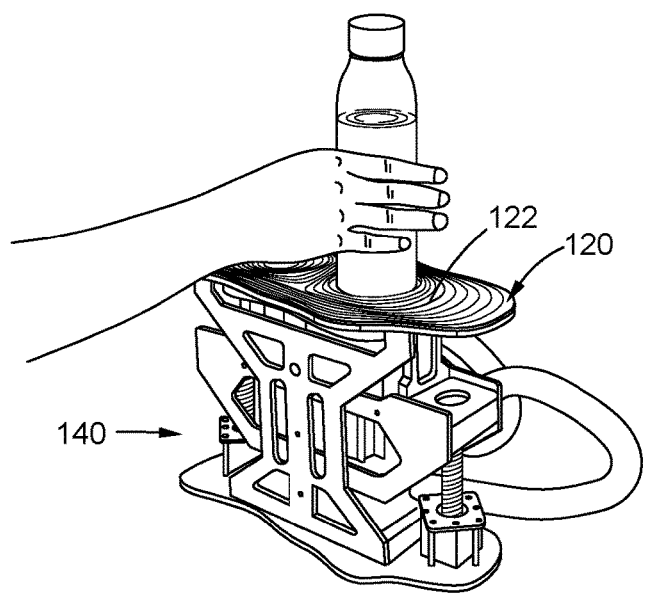
FIGS. 3A-3C are series perspective views illustrating aspects of an exemplary method for using the personal object holding system.
Figure 3B:
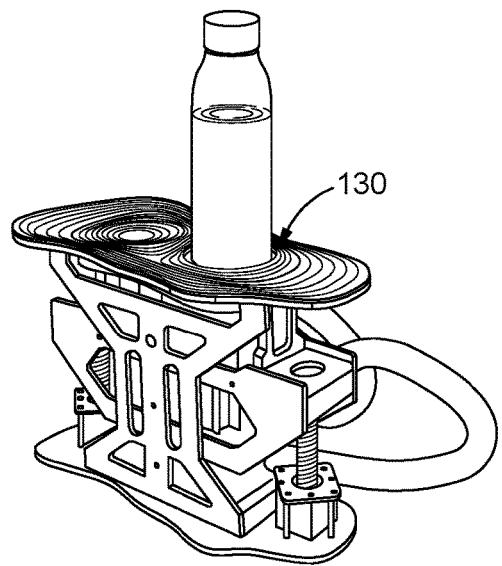
Figure 3C:
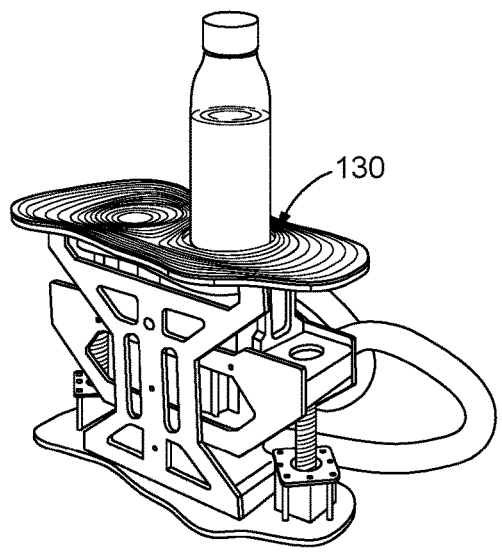

FIGS. 3A-3C illustrate the method in operation for the personal object of a cylindrical container. As illustrated, when the container is placed on the segmented surface 120, the system 10 recognizes that the cylinder has been placed on the segmented surface 120. The system 10 then controls its surface elements 122 so as to form an appropriate holding area 130 for holding the container. Forming the appropriate holding area 130 in the illustrative example involves retracting surface elements 122 in a circular shape below the container, as is shown in the transitions from FIGS. 3A-3C.

FIGS. 4A-4B similarly illustrate the method in operation for the personal object of a smartphone. As illustrated, when the smartphone is placed on the segmented surface 120, the system 10 recognizes that the smartphone has been placed on the segmented surface 120. The system 10 then controls its surface elements 122 so as to form an appropriate holding area 130 for holding the smartphone. Forming the appropriate holding area 130 in the illustrative example involves retracting surface elements 122 in a tray like shape below the smartphone, as is shown in the transitions from FIGS. 4A-4B.

The objects, advantages and features described in detail above are considered novel over the prior art of record and are considered critical to the operation of at least one embodiment of the present invention and to the achievement of at least one objective of the present invention. The words used in this specification to describe these objects, advantages and features are to be understood not only in the sense of their commonly defined meanings, but also to include any special definition with regard to structure, material or acts that would be understood by one of ordinary skilled in the art to apply in the context of the entire disclosure.

Moreover, various elements described herein in terms of functionality generally include hardware and/or software/firmware, including but not limited to: processors, memories, input/output interfaces, operating systems and network interfaces, configured to effectuate the functionalities described herein, as would be understood by one of ordinary skill in the art. When implemented in software, the elements of the invention are essentially the code segments to perform the necessary tasks. The code segments can be stored in a non-transitory processor readable medium, which may include any non-transitory medium that can store information. Examples of the non-transitory processor readable medium include an electronic circuit, a semiconductor memory device, a ROM, a flash memory or other non-volatile memory, a floppy diskette, a CD-ROM, an optical disk, a hard disk, etc.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C. An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation. It will also be understood that the examples and embodiments described herein are not intended to be limiting, but are rather intended to be illustrative of the principles of operation of certain aspects of the disclosed invention.

Moreover, the definitions of the words or drawing elements described herein are meant to include not only the combination of elements which are literally set forth, but all equivalent structures, materials or acts for performing substantially the same function in substantially the same way to obtain substantially the same result. In this sense, it is therefore contemplated that an equivalent substitution of two or more elements may be made for any one of the elements described and its various embodiments or that a single element may be substituted for two or more elements in a claim without departing from the scope of the present invention.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted in conjunction with the appended claims.

What is claimed is:

1. A system for holding a personal object in a motor vehicle, comprising:
   a segmented surface having a plurality of adjacent surface elements;
   a plurality of actuators, each actuator associated with a surface element and configured to extend and/or retract the associated surface element;
   a sensor system configured to detect circumstances affecting the holding of the personal object by the segmented surface; and
   a controller operably coupled to the actuators and the sensor system, the controller configured to selectively control the actuators to extend and/or retract associated surface elements based on the detected circumstances so as to form a holding area appropriate for holding the personal object.

2. The system of claim 1, further comprising:
   a memory in which a plurality of profiles, each associated with recognized circumstances, is stored,
   wherein each of the profiles indicates the shape and location of one or more holding areas appropriate for holding the personal object under associated recognized circumstances,
   wherein the controller is further configured to, in response to detecting recognized circumstances, control the actuators in accordance with the associated profile to extend and/or retract associated surface elements to form the one or more holding areas.

3. The system of claim 2, wherein the plurality of profiles includes a neutral profile and at least one holder profile.

4. The system of claim 2, wherein each profile associates the individual surface elements with respective extension/retraction values, the extension/retraction values representing a magnitude and direction by which to extend/retract the individual surface elements to form the one or more holding areas.

5. The system of claim 2, wherein the recognized circumstances include the recognition of a size of the personal object.

6. The system of claim 2, wherein the recognized circumstances include the recognition of a shape of the personal object.

7. The system of claim 2, wherein the recognized circumstances include the recognition of a location of the personal object.

8. The system of claim 2, wherein the recognized circumstances include the recognition of an identity of the personal object.

9. The system of claim 2, wherein the recognized circumstances include the recognition of driving conditions.

10. The system of claim 2, wherein the recognized circumstances include a change in detected circumstances.

11. The system of claim 2, wherein the holding area is a dynamic holding area adapting to changes in detected circumstances.

12. The system of claim 1, further comprising: a continuous elastic overlay covering gaps between the surface elements of the segmented surface so as to inhibit debris from becoming caught in the gaps.

13. The system of claim 2, wherein the surface elements are thermos-electric and the controller is further configured to control a temperature of the thermos-electric surface elements based on the detected circumstances.

14. The system of claim 2, wherein the surface elements are inductive charging surface elements and the controller is further configured to control a charging state of the inductive charging surface elements based on the detected circumstances.

15. A method for holding a personal object holder in a motor vehicle, the personal object holder including: a segmented surface having a plurality of adjacent surface elements; a plurality of actuators, each actuator associated with a surface element and configured to extend and/or retract the associated surface element; a sensor system configured to detect circumstances affecting the holding of the personal object by the segmented surface; and a controller operably coupled to the actuators and the sensor system, the controller configured to selectively control the actuators to extend and/or retract associated surface elements based on the detected circumstances, the method comprising:
   detecting, via the sensor system, the circumstances affecting the holding of the personal object;
   adopting a profile corresponding to the detected circumstances, the profile indicating the shape and location of one or more holding areas appropriate for holding the personal object under the detected circumstances;
   controlling, via the controller, the plurality of actuators, in accordance with the profile, to selectively extend and/or retract associated surface elements to form the one or more holding areas.

16. The system of claim 2, wherein the plurality of profiles includes a neutral profile and at least one holder profile.

17. The system of claim 2, wherein each profile associates the individual surface elements with respective extension/retraction values, the extension/retraction values representing a magnitude and direction by which to extend/retract the individual surface elements to form the one or more holding areas.

18. The system of claim 2, wherein the recognized circumstances include the recognition of one or more of: a size of the personal object; a shape of the personal object; a location of the personal object; an identity of the personal object; and driving conditions.

19. The system of claim 18, wherein the recognized circumstances include a change in detected circumstances.

* * * * *